United States Patent [19]

Masters et al.

[11] Patent Number: 5,093,975

[45] Date of Patent: Mar. 10, 1992

[54] METHOD OF MAKING NEW SIDE TRIMMER AND SIDE TRIMMER BLADE

[75] Inventors: Joseph Masters, Waterford; Jerome E. Kedziora, Greendale, both of Wis.

[73] Assignee: The Kinetic Company, Greendale, Wis.

[21] Appl. No.: 621,786

[22] Filed: Dec. 4, 1990

[51] Int. Cl.⁵ ................................................ B21K 5/12
[52] U.S. Cl. ............................... 29/400.1; 83/676; 83/13; 76/115; 82/1.11
[58] Field of Search ............... 76/115, 101.1; 83/13, 83/500, 679, 676, 673, 174, 174.1; 82/1.11; 29/400.1

[56] References Cited

U.S. PATENT DOCUMENTS

| | | | |
|---|---|---|---|
| 3,081,661 | 3/1963 | MacPherson | 83/676 |
| 3,172,326 | 3/1965 | Hamilton | 83/676 X |
| 3,295,401 | 1/1967 | Rackoff | 83/676 |
| 3,465,631 | 9/1969 | Reeder, Jr. | 83/676 X |
| 3,682,032 | 8/1972 | Pfeiffer | 83/676 X |
| 4,388,085 | 6/1983 | Sarin et al. | |
| 4,406,667 | 9/1983 | Sarin et al. | |
| 4,406,668 | 9/1983 | Sarin et al. | |
| 4,409,004 | 10/1983 | Sarin et al. | |
| 4,416,670 | 11/1983 | Sarin et al. | |
| 4,421,525 | 12/1983 | Sarin et al. | |
| 4,431,431 | 2/1984 | Sarin et al. | |
| 4,440,547 | 4/1984 | Sarin et al. | |
| 4,441,894 | 4/1984 | Sarin et al. | |
| 4,449,989 | 5/1984 | Sarin et al. | |
| 4,497,228 | 2/1985 | Sarin et al. | |
| 4,498,361 | 2/1985 | Grace | 76/101.1 |
| 4,548,117 | 10/1985 | Frye | 83/500 |
| 4,770,673 | 9/1988 | Ketcham et al. | |
| 4,849,381 | 7/1989 | Brandt et al. | |
| 4,852,999 | 8/1989 | Mehrotra et al. | |
| 4,867,761 | 9/1989 | Brandt et al. | |
| 4,972,750 | 11/1990 | Paavola | 83/500 |

Primary Examiner—Frank T. Yost
Assistant Examiner—Rinaldi Rada
Attorney, Agent, or Firm—Fuller, Ryan & Hohenfeldt

[57] ABSTRACT

A side trimmer made from hardened steel has an inner diameter with a keyway, an outer diameter, and two faces. A recess is machined in the faces to a radius greater than the keyway root. The recesses enable the faces to be hard faced with a ceramic tool without the tool being destroyed by interrupted cuts at the keyway. At least one face is formed with an annular groove that separates the faces into inner and outer faces. The outer face cooperates with the outer face of a second side trimmer to form a nip that trims a moving coil. When the outer faces have worn, they are resharpened by hard turning with a ceramic tool.

20 Claims, 3 Drawing Sheets

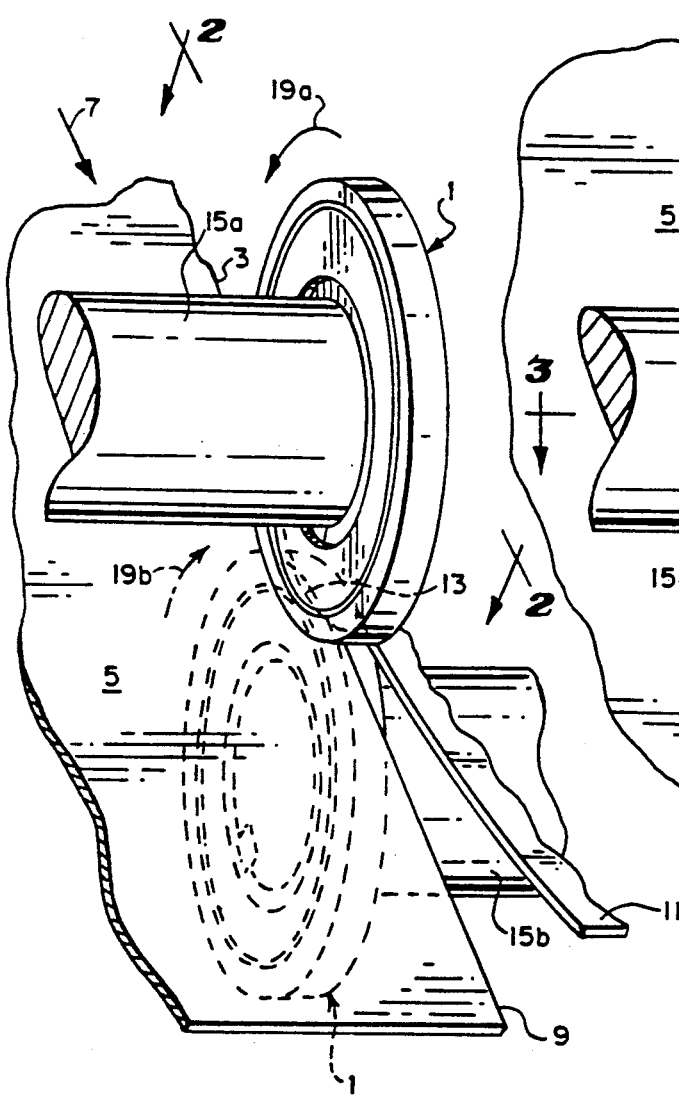
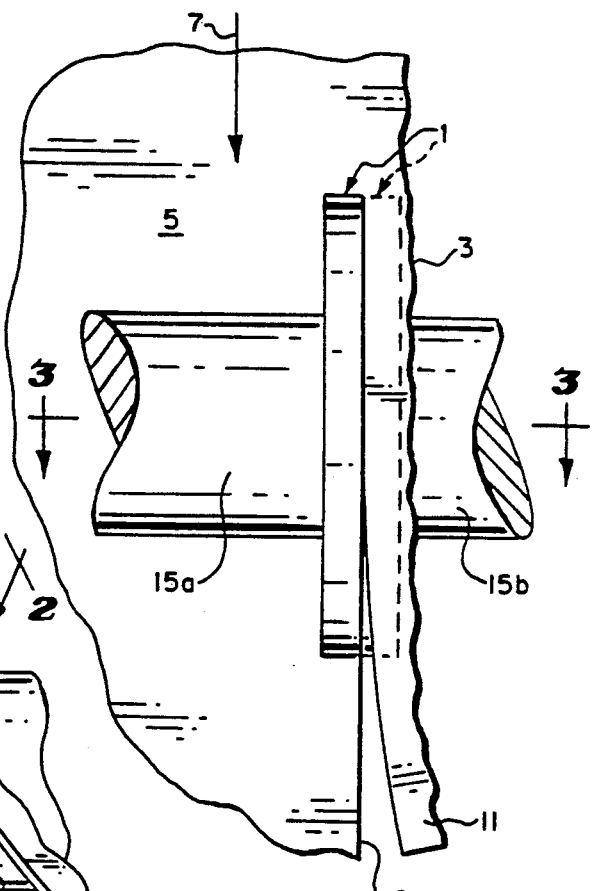
FIG. 1
FIG. 2

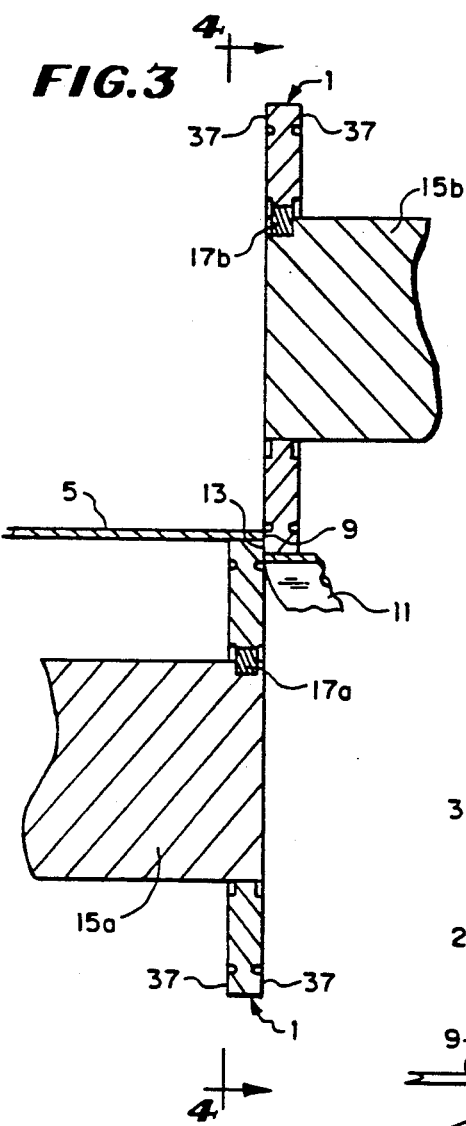
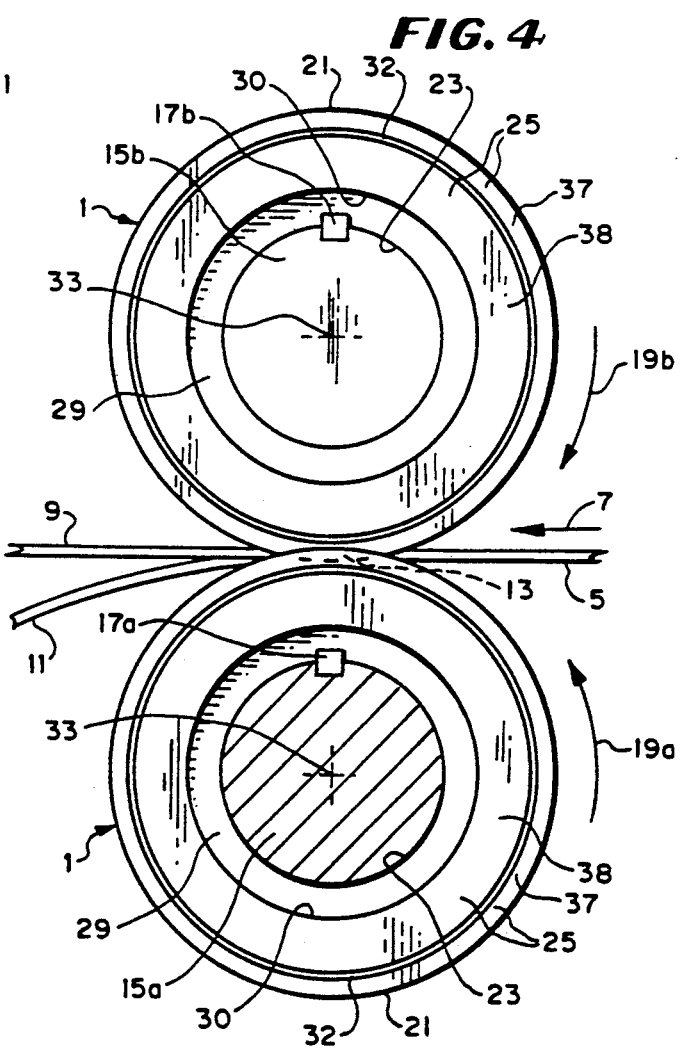

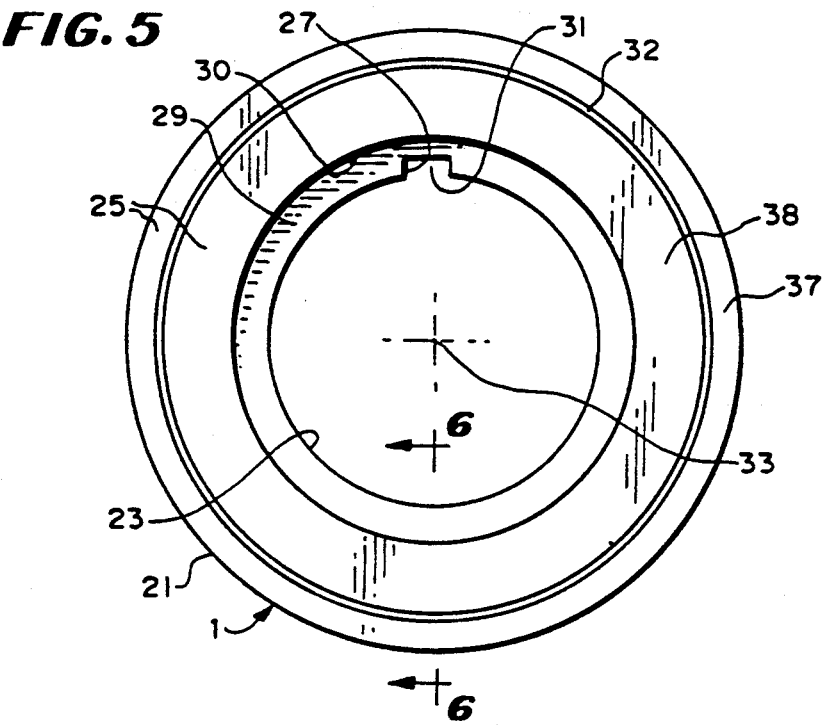
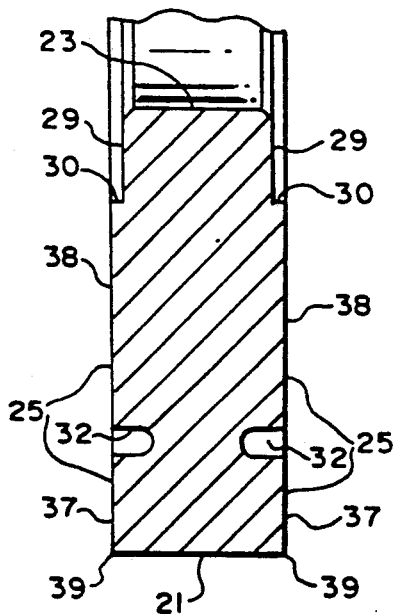
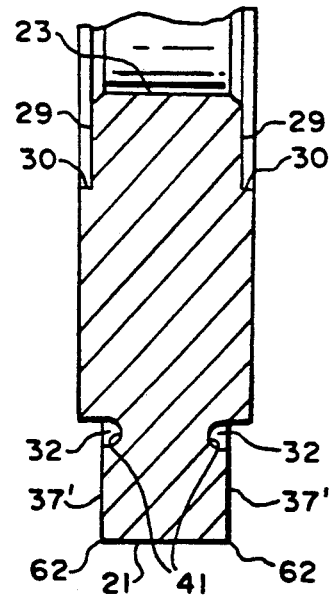
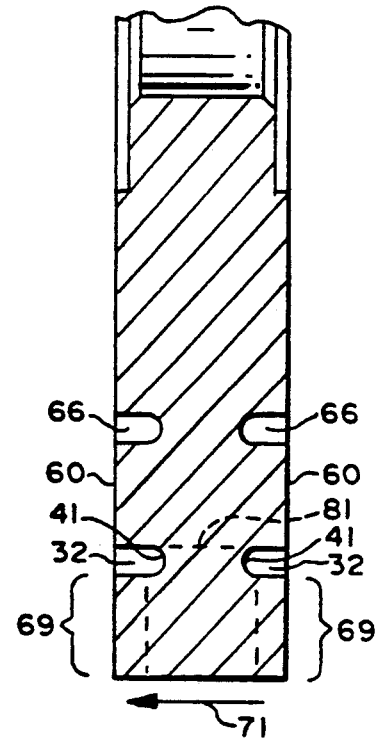

METHOD OF MAKING NEW SIDE TRIMMER AND SIDE TRIMMER BLADE

BACKGROUND OF THE INVENTION

1. Field of the Invention

This invention pertains to metal cutting, and more particularly to apparatus for trimming metal coils.

2. Description of the Prior Art

An essential step in producing sheet metal in coils is the trimming of the coil edges as it leaves the rolling station. Various equipment has been developed to perform the trimming operation. Such equipment includes pairs of cooperating rotary trimmer blades. The trimmer blades may be in the form of cylindrical disks having flat faces and sharp corners between the disk faces and the outer diameters. For satisfactory operation and long life, the trimmer blades are made of hardened steel.

The manufacture of prior trimmer blades is somewhat inefficient. That is because the manufacturing process requires a surface grinding operation on the blade faces. The surface grinding operation is time consuming and requires the use of specialized and expensive machine tools. Further, prior manufacturing methods require grinding of the outer periphery, which necessitates the use of a second grinding machine.

In operation, the trimmer blades are placed with their faces parallel to each other. Their peripheries overlap a slight distance with minimal clearance between the overlapping faces such that the faces lie in a common plane. The blades rotate in opposite directions, and their overlapping faces form a nip through which a margin of the metal coil passes. As the coil passes through the nip, the coil is sheared along the common plane.

After extended service, the trimmer blades begin to dull. The sharp corners become rounded and eventually lose their cutting ability. At that time, the trimmer blades are removed from service and are resharpened.

Because of the hardness of the trimmer blades, resharpening prior trimmer blades presents a problem. Their faces must be ground, but many sheet steel mills which make coils do not have surface grinding equipment. Consequently, prior art dull trimmer blades must be sent to the manufacturer for resharpening, which results in undesirable shipping and handling costs. Repeated surface grinding of these blades reduces the thickness of the blade hub. Hence, spacers may be required if there is not adequate thread length on the arbor. In addition, resharpening the trimmer blades at the factory by surface grinding is a slow and expensive operation.

Thus, a need exists for improvements in the field of trimmer blades.

SUMMARY OF THE INVENTION

In accordance with the present invention, a coil side trimmer is provided that is more economical to manufacture and resharpen than prior trimming equipment. This is accomplished by designing the side trimmers to be manufactured and resharpened by hard turning rather than by grinding operations. The hub of the trimmer blade is not turned or ground when resharpened.

The side trimmer has the general shape of a hollow cylinder with parallel faces. They range in size up to two and one-half inches thick. The internal diameter is sized to fit over a standard coil trimming arbor that drives the side trimmer by means of a key. The faces of the side trimmer make sharp corners at their respective junctions with the outer diameter. For maximum strength and rigidity, the side trimmer has substantial thickness.

The side trimmer is made from a hardenable steel. The manufacturing process includes rough machining the side trimmer prior to hardening, and finish machining takes place after hardening. It is a feature of the present invention that finish machining of the faces and outer diameter is achieved by hard turning using a ceramic tool rather than by surface and external grinding. To enable such hard turning, the side trimmer is designed with a recess or undercut in each face surrounding the internal diameter. Each recess has a radius that is slightly greater than the distance from the side trimmer axis to the keyway root. The recesses are machined into the respective faces before hardening, and they are deeper than the thickness of the material on the faces that is removed at finish machining. Consequently, the side trimmer face areas outside of the recesses can be finish machined in a continuous cut with a ceramic tool, and the probable destruction of the ceramic tool by an interrupted cut due to the keyway is eliminated.

Further in accordance with the present invention, the side trimmer is designed to be resharpened in the field rather than at the manufacturing plant. For that purpose, at least one and preferably both faces of the side trimmer are formed with an annular groove so as to divide the face into inner and outer faces. The outer face has a sufficient radial width to properly overlap the outer face of a cooperating side trimmer to trim the edge of a web or coil of sheet metal.

After the outer faces of the cooperating side trimmers have worn because of use in trimming the coil metal, the side trimmers are removed from their arbors for resharpening. The side trimmer outer faces are hard turned on a lathe at the mill with a ceramic tool. Rough turning may be required with a carbide tool if trimmer surfaces are rough as a preliminary step. The grooves are designed to enable the use of a four-sided ceramic tool with a lead angle for the hard turning operation. In that manner, not only is the prior requirement of returning the side trimmer to the factory for resharpening eliminated, but the possibility of ceramic tool failure during the hard turning resharpening process is greatly reduced.

The annular grooves permit reducing the thickness of the side trimmer only near the outer diameter because of sharpening. A side trimmer can be resharpened until the outer face reaches the level of the root of the annular groove. The depth of the groove is designed so that the side trimmer still has ample rigidity as it nears the end of its useful life. When both outer faces have been resharpened a number of times such that they have reached the level of the roots of their respective annular grooves, the side trimmer is recycled or discarded.

In a modified embodiment of the invention a second set of annular grooves of a smaller radius are provided to afford a second zone for resharpening. This further increases the life of the trimmer. Other objects and features of the invention will become apparent from the disclosure.

BRIEF DESCRIPTION OF THE DRAWINGS

FIG. 1 is a perspective view of a pair of side trimmers, each of which embodies the features of the invention, with the side trimmers installed for trimming coil metal;

FIG. 2 is a top view of the trimmers taken generally along line 2—2 in FIG. 1;

FIG. 3 is a rear sectional view of the trimmers taken generally along line 3—3 in FIG. 2;

FIG. 4 is a side view of the side trimmers taken generally along line 4—4 in FIG. 3;

FIG. 5 is an enlarged side view of one of the side trimmers of the present invention;

FIG. 6 is a cross-sectional view of one of the side trimmers taken along line 6—6 of FIG. 5;

FIG. 7 is a cross-sectional view similar to FIG. 6, but showing the side trimmer after having been resharpened; and FIG. 8 is a cross-sectional view similar to FIG. 6, but showing a modified embodiment of the side trimmer that also embodies the features of the invention.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIGS. 1 to 4, a pair of side trimmers 1 are illustrated that include the present invention. As FIG. 1 shows, the side trimmers are particularly useful for trimming the edge 3 of a thin gauge coil 5 of metal, typically a coil of steel. The invention, however, is not limited to metal cutting operations.

In the particular application of the side trimmers 1 shown in FIGS. 1 to 4, a conventional web or coil 5 of metal or steel or similar material is formed by rolling equipment as is known in the art and is not shown. The coil 5 is fed in the direction of arrow 7 (see FIG. 1) by auxiliary well known means, which is not illustrated. The coil has rough edges 3 as it leaves the rolling equipment.

In accordance with the present invention, the opposite edges 3 of the rolled coil 5 are trimmed by the side trimmers 1 to be straight and at a specified distance apart; a finish edge is represented by reference numeral 9. As a part of the trimming process, a strip 11 of trim scrap is produced along the coil edge. Coil trimming is achieved by passing an edge 3 through a nip 13 formed by two overlapping side trimmers (as best shown in FIG. 3).

Each side trimmer 1 is rigidly but removably mounted to a respective arbor 15a and 15b. Driving of the side trimmers on the arbors 15a and 15b is by respective keys 17a and 17b. The direction of rotation of the arbors is indicated by arrows 19a and 19b (see FIGS. 1 and 4).

In the preferred embodiment (and please refer now to FIGS. 4 to 6), each side trimmer 1 is constructed as a hollow cylinder having an outer diameter 21, an inner diameter 23, and opposed faces 25 which extend from the recess 29 to the outside diameter or periphery 21. Representative dimensions for an exemplary side trimmer are approximately 16 inches for the outer diameter 21, 8.50 inches for the internal diameter 23, and a nominal thickness of approximately 1.50 inches between the two faces 25. A keyway 27 formed in the inner diameter 23 may be approximately 1 inch wide and 0.50 inches deep. The side trimmer is made from a high quality hardenable steel such as AISI H13 tool steel.

It is a feature of the present invention that the side trimmer 1 is manufactured by a process that avoids grinding of the outer diameter 21 and the faces 25. For that purpose, the manufacturing process starts with the operation of sawing a blank of material from a length of solid or hollow forged bar stock. Individual forgings, either disks or rings, may be substituted for a sawed piece of solid or hollow forged bar stock. The blank is chucked in a lathe, where it is drilled and/or bored to a rough dimension for the inner diameter 23. One face 25 is rough turned on the lathe, and a recess 29 is machined in the face. An annular groove 32 is also cut in the face. As FIG. 8 shows, a second annular groove 66 may also be cut into the face at this time. The blank is reversed in the lathe, so face 25, recess 29 and groove 32 can be machined in the opposite face. The second annular groove 66 may also be cut in the face at this time. The outer diameter 21 is turned. The keyway 27 is then cut in the internal diameter. The root, i.e., the deepest surface 31 of the keyway is closer to the side trimmer axis 33 than the radius 30 of the recess. The blank is then hardened and tempered to approximately 54-56 Rockwell C. After the heat treat operation, one face 25 is hard turned with a ceramic tool. Then the inside diameter 23 of the hole is ground to the finished size locating off the hard turned face 25. The other face 25 is then hard turned and finally the outside diameter is hard turned to size.

Unlike prior trimming blades, the faces 25 and outer diameter 21 of the semi-finished side trimmer 1 are not ground to bring their respective dimensions to finish size. Rather, the outer diameter and faces are hard turned in a lathe with a suitable ceramic turning tool, such as are manufactured by Kennametal Company of Latrobe, Pennsylvania. One face is hard turned by a suitable ceramic facing tool to create one of the sharp corners 39 at the junction of the face and outer diameter. The presence of the recess 29 in the face enables the hard turning operation to be performed without requiring the ceramic tool to contact the keyway 27, which would destroy the ceramic tool by the resulting interrupted cut. After grinding the internal diameter 23, the side trimmer is reversed in the lathe chuck and the second face is hard turned so as to create the other sharp corner 39. The side trimmer is complete and ready for installation on an arbor 15a, 15b.

As mentioned, the side trimmer 1 is provided with a groove 32 in each face 25. Each groove divides its associated face into an outer face 37 and an inner face 38. The grooves are located on the side trimmer such that the nip 13 between cooperating side trimmers occurs exclusively on their respective outer faces 37. The purpose of inner and outer face construction is to greatly simplify and economize the process of resharpening the side trimmers. Periodic resharpening is required because the corners 39 and the outer faces 37 of the mating side trimmers gradually wear as they trim the coil steel 5 passing through the nip. With prior trimming blades, surface grinding the faces 25 was required to resharpen the corners 39 and the faces. However, most steel rolling mills and similar facilities do not have surface grinding equipment. With the division of the face into inner and outer faces, the side trimmer can be resharpened at the mill merely by chucking it in a lathe and hard turning with a ceramic tool across the outer face 37. If the faces are rough as a result of wear a preliminary turning can be done with a carbide cutting tool. If necessary, the outer diameter 21 can be hard turned a slight amount. Since most steel rolling mills have lathes, the side trimmers can remain there, thereby saving the time and expense of both the surface grinding operation and the shipping to the manufacturer and back.

The grooves 32 are located and dimensioned such that reducing the thickness of the side trimmer 1 between the faces 37 through resharpening does not adversely affect its overall strength and rigidity. With a nominal thickness of 1.50 inches for the side trimmer, a satisfactory depth for each groove 32 is approximately 0.38 inches. We have found that a width of approximately 0.25 inches for the grooves 32 works very well. That width enables the outer faces 37 to be resharpened with a four-sided ceramic tool having a lead angle, so the initial cutting of the tool can be made with the tool's edge rather than its point. That procedure greatly reduces the possibility of ceramic tool failure.

FIG. 7 shows a side trimmer of 1.50" that has been resharpened on both outer faces 37 to leave faces 37' with corners 62. If desired, of course, the side trimmer can be manufactured with only one groove 32 and thus resharpened on only one face 37. Resharpening can be repeated until the outer faces 37' reach the levels of the roots 41 of the grooves 32. At that point, the side trimmer has reached the end of its useful life. The depth of the grooves 32 is chosen such that sufficient strength and rigidity are present at the outer face for proper trimming of the coil steel 5 even when the outer faces reach the level of the groove roots 41.

FIG. 8 shows a modified embodiment of the invention in which a second groove 66 is provided to provide an additional cutting zone 60 after the outer cutting zone 69 is worn down. The remaining portions of faces 37' of FIG. 7 are removed to the roots 41 of grooves 32 with a ceramic tool moved in the direction of arrow 71. The new outer diameter 81 is then formed by a final pass of the cutting tool parallel to the axis of the arbor by turning with a ceramic tool in the direction of arrow 71. With use of the FIG. 8 embodiment, the faces 60 can then be hard turned as required to maintain a sharp cutting edge.

Thus, it is apparent that there has been provided, in accordance with the invention, a method of making new side trimmers and side trimmer blades that fully satisfy the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

Although the present invention is described in association with ceramic tools, any other tool developed in the future with ability to turn tool steel or high speed steel hardened to Rockwell 56 C. to 62 C. can be employed to obtain the benefits of the invention. The use of the term "ceramic" in the claims is intended to encompass all tools which could be employed in the method described herein. Various cutting tool materials have been disclosed in the last few years which may be adapted for use in practicing the invention. These patents are included in the following: U.S. Pat. No(s) 4,849,381; 4,852,999; 4,867,761; 4,770,673; 4,441,894; 4,440,547; 4,449,989; 4,421,525; 4,431,431; 4,406,667; 4,388,085; 4,409,003; 4,409,004; 4,416,670; and 4,406,668.

We claim:

1. A method of trimming the edges of a moving coil comprising the steps of:
   a. providing a first side trimmer made of hardened steel and having a face that defines an annular groove that divides the face into inner and outer faces;
   b. providing a second side trimmer made of hardened steel and having a face that defines an annular groove that divides the face into inner and outer faces;
   c. placing an outer face of the first side trimmer in close facing contact with an outer face of the second side trimmer to form a nip therebetween;
   d. rotating the side trimmers in opposite directions and passing the coil through the nip to trim the edge thereof; and
   e. resharpening said outer faces of at least one of the first and second side trimmers by hard turning thereof.

2. The method of claim 1 wherein the first side trimmer has a recess in the inner face thereof that has a predetermined radius and an inner diameter with a keyway therein that lies within the inner face recess.

3. The method of claim 1 comprising the further step of resharpening the first and second side trimmers by hard turning the respective outer faces thereof.

4. The method of claim 1 wherein:
   a. the step of providing a first side trimmer defining an annular groove in the face thereof comprises the step of providing the annular groove with a predetermined depth; and
   b. the step of resharpening the first side trimmer comprises the step of hard turning the first side trimmer outer face until the outer face reaches the depth of the annular groove.

5. A side trimmer comprising a hollow cylinder made from hardened steel and having a longitudinal axis, an inner diameter, an outer diameter, and opposed faces perpendicular to the longitudinal axis, the inner diameter defining a keyway having a root at a predetermined distance from the longitudinal axis, each face being formed with a central recess that has a radius that is slightly greater than the distance of the keyway root from the longitudinal axis to thereby enable the faces to be hard turned with a ceramic tool without the tool encountering an interrupted cut at the keyway, at least one face defining an annular groove that separates the face into inner and outer faces, the outer face being contactable by a coil of material for trimming thereof and being resharpenable by hard turning when worn due to contact with the coil of material.

6. The side trimmer of claim 5 wherein both faces define an annular groove that separates the respective faces into inner and outer faces,
   so that both outer faces are contactable by a coil of material and both outer faces can be resharpened by hard turning.

7. The side trimmer of claim 6 wherein the thickness between the opposed outer faces prior to resharpening is approximately 1.50 inches, and wherein the depth of the annular grooves is approximately 0.38 inches,
   so that each of the outer faces can be resharpened approximately 0.38 inches.

8. The side trimmer of claim 5 wherein the groove has a root at a predetermined depth to enable the outer face to be resharpened until it reaches the level of the groove root.

9. A side trimmer according to claim 8 wherein two annular grooves are provided on each face so that after resharpening of both outer faces of the trimmer to the level of the roots of the outermost grooves, the outer diameter of the trimmer can be reduced by removing that portion of the trimmer located a greater distance from the axis than the bottom of the outermost annular grooves, whereby an additional cutting zone, also resharpenable by hard turning is provided.

10. The side trimmer of claim 5 wherein the annular groove has a width of approximately 0.25 inches to thereby enable the outer face to be resharpened with a four-sided ceramic tool with a lead angle that initially cuts with an edge thereof.

11. Apparatus for trimming an edge of a web of coil metal comprising:
 a. a first side trimmer fabricated as a hollow cylinder made from a hardened steel and having a longitudinal axis, an inner diameter, an outer diameter, and opposed parallel faces, the inner diameter defining a keyway having a root at a predetermined distance from the longitudinal axis, the faces being machined with respective central recesses, each recess having a radius slightly greater than the distance from the keyway root to the longitudinal axis to enable the associated face to be hard turned with a ceramic tool without destroying the ceramic tool by an interrupted cut at the keyway, at least one face being formed with an annular groove that separates the face into inner and outer faces; and
 b. a second side trimmer fabricated as a hollow cylinder made from a hardened steel and having a longitudinal axis, an inner diameter, an outer diameter, and opposed parallel faces, the inner diameter defining a keyway having a root at a predetermined distance from the longitudinal axis, the opposed parallel faces being machined with respective recesses, each recess having a radius slightly greater than the distance from the keyway root to the longitudinal axis to enable the face to be hard turned with a ceramic tool without destroying the tool by an interrupted cut at the keyway, at least one of said opposed parallel faces being formed with an annular groove that separates the face into inner and outer faces, the outer faces of the first and second side trimmers being in close facing proximity to cooperate to form a nip for trimming the edge of the coil metal passing through the nip, the outer faces of the first and second side trimmers being resharpenable by hard turning with a ceramic tool.

12. The apparatus of claim 11 wherein both faces of the first and second side trimmers are formed with annular grooves to thereby enable either outer face of the first and second side trimmers to be placed in close facing proximity with the outer face of the other side trimmer to form a nip therewith.

13. The apparatus of claim 11 wherein the annular groove of each side trimmer has a root at a predetermined depth from the associated face,
 so that the outer face can be resharpened until it reaches the level of the groove root.

14. The apparatus of claim 11 wherein the annular groove of each side trimmer has a width of approximately 0.25 inches to thereby enable the outer fact to be resharpened with a four-sided ceramic tool with a lead angle that initially cuts with an edge thereof.

15. a method of manufacturing a side trimmer comprising the steps of:
 a. sawing a blank from stock selected from the group of hardenable bar stock, individual forgings, discs and rings;
 b. forming an internal diameter by drilling or boring, facing one side, machining a recess in the resultant face adjacent the inner diameter with a predetermined radius and forming an annular groove in said one face to separate said face into an inner face and an outer face;
 c. turning the opposite side to form an opposing face and machining a recess therein adjacent the inner diameter thereof with a predetermined radius, turning the outer diameter, and forming another annular groove in the opposite face to separate the face into an inner face and an outer face;
 d. machining a keyway in said internal diameter;
 e. heat treating and tempering the blank to a predetermined hardness;
 f. hard turning at least one of the outer faces with a ceramic tool;
 g. grinding the internal diameter to a finish size; and
 h. hard turning the outside diameter.

16. The method of claim 15 comprising the further step of resharpening the side trimmer outer face by hard turning thereof.

17. The method of claim 16 comprising the further steps of:
 a. forming an annular groove on both faces to thereby separate both faces into respective inner and outer faces; and
 b. resharpening both outer faces by hard turning.

18. The method of claim 15 including the step of forming a second annular groove having a radius less than the other annular groove in each of the opposed faces.

19. The method of claim 16 wherein:
 a. the step of forming a groove in at least one of the opposed faces comprises the step of forming the groove to a predetermined depth; and
 b. the step of resharpening the side trimmer outer face comprises the step of hard turning the outer face until it reaches the depth of the groove.

20. A method of claim resharpening a side trimmer comprising:
 providing a side trimmer with opposed spaced hardened side faces perpendicular to the longitudinal axis thereof with sharp corners at the outer diameter thereof, a first annular groove in each of said side faces with a common radius, and with second annular grooves in the faces with a diameter less than the first annular grooves,
 resharpening said corners, when required, by turning both of said side faces between the outer diameter and said first groove with a ceramic facing tool, and
 subsequently removing all the trimmer material in a first zone between the outer diameter and the bottom of said first annular grooves to expose for use a second set of corners on a second zone of said trimmer.

* * * * *

UNITED STATES PATENT AND TRADEMARK OFFICE
CERTIFICATE OF CORRECTION

PATENT NO. : 5,093,975
DATED : March 10, 1992
INVENTOR(S) : Joseph Masters and Jerome E. Kedziora It is certified that error appears in the above-identified patent and that said Letters Patent is hereby corrected as shown below:

Column 7, line 65:
    Delete "fact" and substitute --- face ---.

Column 8, line 47:
    Delete "claim".

Signed and Sealed this

Fifteenth Day of June, 1993

Attest:

MICHAEL K. KIRK

Attesting Officer     Acting Commissioner of Patents and Trademarks